United States Patent [19]  
Hasuo et al.

[11] Patent Number: 4,840,981  
[45] Date of Patent: Jun. 20, 1989

[54] POLYETHYLENE TEREPHTHALATE RESIN COMPOSITION

[75] Inventors: Masayoshi Hasuo, Yokohama; Seiichi Mukai, Kunitachi; Ryo Saito; Isao Ikuhara, both of Yokohama, all of Japan

[73] Assignee: Mitsubishi Chemical Industries Limited, Tokyo, Japan

[21] Appl. No.: 177,477

[22] Filed: Apr. 1, 1988

[30] Foreign Application Priority Data

Apr. 3, 1987 [JP] Japan ................................ 62-82477  
Apr. 3, 1987 [JP] Japan ................................ 62-82479

[51] Int. Cl.⁴ ........................... C08K 5/13; C08K 5/09  
[52] U.S. Cl. ................................. 524/114; 524/394; 524/605  
[58] Field of Search ............................. 524/114, 394

[56] References Cited

U.S. PATENT DOCUMENTS 4,322,335 3/1982 Nield .  
4,368,288 1/1983 Nield .  
4,385,144 5/1983 Jones et al. .................... 524/114  
4,393,178 7/1983 Legras et al. .

Primary Examiner—Lewis T. Jacobs  
Attorney, Agent, or Firm—Oblon, Spivak, McClelland, Maier & Neustadt

[57] ABSTRACT

A polyethylene terephthalate resin composition comprising a polyethylene terephthalate resin and from 0.1 to 3% by weight, based on the polyethylene terephthalate resin, of an aromatic compound of the formula:

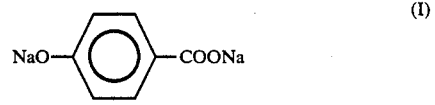

3 Claims, No Drawings

POLYETHYLENE TEREPHTHALATE RESIN COMPOSITION

The present invention relates to a polyethylene terephthalate resin composition. More particularly, it relates to a polyethylene terephthalate resin composition having the crystallization velocity remarkably improved.

Polyethylene terephthalate is a resin having excellent properties such as mechanical properties. Most of such properties are attributable to the fact that this resin is a crystalline polymer. At present, this resin is produced in a large amount for fibers and films. This may be regarded as an good example where such properties meet very well with the requirements in this field. However, on the other hand, it has been pointed out that its crystallization velocity is low, which hinders its development in the field of injection molding material. The intrinsic properties of this resin are very much attractive as an injection molding material, and expectation of its improvement to be suitable for injection molding is high. With such a background, many attempts have been conducted to improve the crystallization properties. Recently, there has been an increasing demand for a small sized thin molded product, and such a demand can not be satisfied by conventional techniques. Methods for improving the crystallization properties have been proposed, for example, in U.S. Pats. Nos. 4,368,288, 4,322,335 and 4,393,178. However, the crystallization velocity is not yet adequate by these methods. Further, these methods had a drawback that it brings about a decrease of the molecular weight of the resin itself, and in some cases, it becomes difficult to obtain a molded product.

It is an object of the present invention to overcome the above-mentioned drawbacks and to provide a polyethylene terephthalate resin composition which makes it possible to mold a thin molded product having high crystallizability. Namely, it has been found it possible to accomplish this object by incorporating a specific amount of a certain specific crystallization accelerator to a polyethylene terephthalate resin. The present invention has been accomplished on the basis of this discovery.

The present invention provides a polyethylene terephthalate resin composition comprising a polyethylene terephthalate resin and from 0.1 to 3% by weight, based on the polyethylene terephthalate resin, of an aromatic compound of the formula:

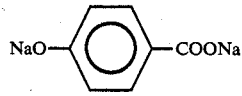
(I)

Now, the present invention will be described in detail with reference to the preferred embodiments.

The crystallization accelerator of the present invention is an aromatic compound having an alkali metal-substituted phenolic hydroxyl group and an alkali metal-substituted carboxylic group and being insoluble in acetone.

The polyethylene terephthalate resin to be used in the present invention is a linear polyethylene terephthalate wherein ethylene terephthalate is a structural unit. However, in some cases, it may be the one copolymerized with a certain amount of a dicarboxylic acid or diol, or it may contain known polyesters other than the ethylene terephthalate structural unit. In such a case, the intrinsic viscosity [η] of the resin or the composition is preferably within a range of from 0.45 to 0.9 dl/g, more preferably from 0.53 to 0.65 dl/g. Here, the intrinsic viscosity [η] is determined from the viscosity of the solution in a solvent of phenol/tetrachloroethane =50/50 (weight ratio) at 30° C. If the intrinsic viscosity [η] is outside this range, the mechanical properties of the resulting polyethylene terephthalate tend to be substantially low, or the flow processability will be low and the moldability will be accordingly poor, such being undesirable.

The crystallization accelerator in the present invention is a sodium salt of a p-hydroxybenzoic acid represented by the following formula:

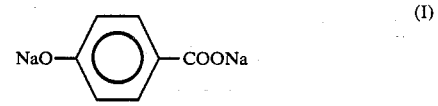
(I)

the crystallization accelerator is used in an amount of from 0.1 to 3% by weight, preferably from 0.5 to 2.5 by weight, based on the polyethylene terephthalate resin. If the amount is outside this range, no adequate effects as a crystallization accelerator may be expected, or a deterioration phenomenon such as a decrease of the molecular weight of the resin which is undesirable from the viewpoint of the mechanical properties, is likely to be brought about.

The crystallization accelerator of the present invention is adequately effective when used by itself. However, the effectiveness can be improved by using it in combination with a known plasticizer such as an ester compound, an ether ester compound or a sulfone amide compound, or a silicate compound such as fine powderly talc, mica, clay or silica.

Particularly when it is used in combination with an epoxy alkane compound of the formula

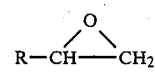

wherein R is an alkyl group having at least 18 carbon atoms, the effectiveness can remarkably be improved.

The epoxy alkane compound of the above formula can be obtained by epoxidizing a straight chain or branched α-olefin having at least 18 carbon atoms and preferably at most 400 carbon atoms, more preferably at most 50 carbon atoms, by a conventional method. The α-olefin as the starting material may be, for example, Dialene 208, (carbon number: 20-28, average carbon number; 23) or Dialene 30 (carbon number: at least 30, average carbon number: 43) manufactured by Mitsubishi Chemical Industries Limited, Dialene is a trade mark). As the epoxy alkane, commercially available α-olefin oxide AOE (manufactured by Daicel Chemical, AOE is a trade mark) may also be employed.

It has been known that a combination of a compound having plasticizing ability and a nucleating agent is effective for the improvement of the crystallization of a polyethylene terephthalate resin. However, since the polyethylene terephthalate resin has an extremely high molding temperature at a level of at least 280° C., such an additive is likely to decompose or gasify to generate a gas, and in an extreme case, the outer appearance of the molded product is likely to be seriously impaired. By the combined use of the epoxy alkane compound of the above formula, foaming during the production can be suppressed, whereby a molded product having improved crystallinity and excellent outer appearance can be obtained quite smoothly.

The epoxy alkane compound is added in an amount of from 0.05 to 6% by weight, preferably from 0.1 to 4% by weight, based on the polyethylene terephthalate resin. If the amount is outside this range, the effectiveness for the improvement of the crystallization acceleration tends to be poor, or a deterioration phenomenon such as a decrease of the molecular weight of the resin which is undesirable from the viewpoint of the mechanical properties, is likely to be brought about.

For the purpose of improving the practical performance, a reinforcing agent such as glass fibers, glass beads, wallastonite or whiskers may be added to the composition of the present invention. It particular, the mechanical properties can be remarkably improved by adding from 5 to 50% by weight, based on the total composition, of glass fibers. Futher, known additives commonly employed for the purpose of flame retardation, heat resistance or weather resistance, may also be added.

Now, the present invention will be described in further detail with reference to Examples. However, it should be understood that the present invention is by no means restricted by these specific Examples.

REFERENCE EXAMPLE

Preparation of the

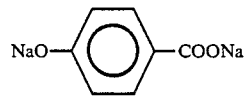

58 g of sodium hydroxide pellets having a purity of 95% were dissolved in 345 g of deionized water to obtain an aqueous sodium hydroxide solution. Then, 100 g of p-hydroxybenzoic acid of a purity of 95% was added and dissolved therein. After cooling the solution to a level of room temperature, about 10 times in volume of acetone was added thereto, whereby the desired disodium salt precipitated. The precipitate was collected by filtration and washed twice with 500 ml of acetone/water=9/1 (volume ratio).

The disodium salt thus obtained was dried in a hot air dryer at 80° C. for one day, and further dried under a reduced pressure of 0.5 Torr at 180° C. for 4 hours.

EXAMPLES 1 to 12 and COMPARATIVE EXAMPLES 1 to 9

The compound prepared in the Reference Examples, the additive identified in Table 1 and 0.3% by weight of Irganox 1010 (tradename, manufactured by Ciba-Geigy Company) were added to a polyethylene terephthalate homopolymer having an intrinsic viscosity $[\eta]$ of 0.66. The mixture thereby obtained was kneaded by a vent-type twin screw extruder (PCM 30 L/D=25, manufactured by Ikegai Tekko K.K.) (cylinder temperature: 220°–280° C.) to obtain pellets. The pellets were subjected to injection molding by an injection molding machine (J 28SA 0.8 ounce) manufacture by Nippon Seikosho K.K.) to obtain a flat plate of 60 mm×60 mm×1 mm in thickness. (cylinder temperature: 280° C., injection/cooling cycle: 15 sec/15 sec, mold surface temperature: 80° C.)

From the flat plate thus obtained, an intersecting portion of diagonal lines was cut out, and the crystallization properties were examined by a differential calorimeter (DSC V/./C Du pont 9,900). In Table 1, Tcc represents a crystallization peak temperature appearing when the temperature is raised from room temperature to 300° C. at a rate of 16° C./min., and Tc represents a crystallization peak temperature appearing when the temperature is lowered at a rate of 16° C./min. after maintaining the sample of 300° C. for 5 minutes. Further, Dc represents a $(1-\Delta H_{Tcc}/\Delta H_{Tc})$ value i.e. a value obtained by subtracting a ratio of $\Delta H_{Tcc}/\Delta H_{Tc}$ from 1 where $\Delta H_{Tcc}$ is a calorific value for the crystallization during the temperature rise and $\Delta H_{Tc}$ is a calorific value for the crystallization during the temperature drop. The closer the value Dc to 1, the more advanced the crystallization during the molding. Thus, Dc can be an index for the improvement of the crystallizability.

In Table 1, AOEY is an epoxy alkane compound obtained by the epoxidation of Dialene 208, and AOEZ is an epoxy alkane compound obtained by the epoxidation of Dialene 30, both being manufactured by Daicel Chemical.

Microwhite 5,000S is a tradename for talc manufactured by Hayashi Kasei K.K.

In the Examples and Comparative Examples, when no epoxy alkane compound was incorporated, substantial fuming was observed at the die orifice during the melt-kneading, and fuming was very little after the incorporation of the epoxy alkane compound.

TABLE 1

| | Crystallization accelerator | wt % | Other additives | wt % | $[\eta]$ dl/g | Tcc °C. | Tc °C. | Dc |
|---|---|---|---|---|---|---|---|---|
| Example 1 | NaO—⟨O⟩—COONa | 1.0 | — | | 0.56 | 117 | 212 | 0.68 |
| Example 2 | NaO—⟨O⟩—COONa | 0.5 | Neopentyl glycol dibenzoate<br>Micronwhite 5,000S | 2.0<br>1.5 | 0.59 | 114 | 215 | 0.59 |

TABLE 1-continued

| | Crystallization accelerator | wt % | Other additives | wt % | [η] dl/g | Tcc °C. | Tc °C. | Dc |
|---|---|---|---|---|---|---|---|---|
| Example 3 | NaO—⟨C6H4⟩—COONa | 1.0 | Neopentyl glycol dibenzoate | 2.0 | 0.56 | 111 | 216 | 0.74 |
| Example 4 | NaO—⟨C6H4⟩—COONa | 1.0 | Neopentyl glycol dibenzoate<br>Micronwhite 5,000S | 2.0<br>1.5 | 0.57 | 110 | 217 | 0.73 |
| Example 5 | NaO—⟨C6H4⟩—COONa | 2.0 | Neopentyl glycol dibenzoate<br>Micronwhite 5,000S | 3.0<br>1.5 | 0.52 | 107 | 217 | 0.85 |
| Example 6 | NaO—⟨C6H4⟩—COONa | 0.5 | AOEY<br>Micronwhite 5,000S | 2.0<br>1.5 | 0.59 | 114 | 215 | 0.61 |
| Example 7 | NaO—⟨C6H4⟩—COONa | 0.5 | AOEZ<br>Micronwhite 5,000S | 2.0<br>1.5 | 0.60 | 115 | 215 | 0.59 |
| Example 8 | NaO—⟨C6H4⟩—COONa | 1.0 | AOEY | 2.0 | 0.60 | 113 | 215 | 0.70 |
| Example 9 | NaO—⟨C6H4⟩—COONa | 1.0 | AOEZ | 2.0 | 0.60 | 114 | 214 | 0.68 |
| Example 10 | NaO—⟨C6H4⟩—COONa | 1.0 | AOEZ<br>Micronwhite 5,000S | 2.0<br>1.5 | 0.58 | 114 | 214 | 0.70 |
| Example 11 | NaO—⟨C6H4⟩—COONa | 1.0 | AOEY<br>Micronwhite 5,000S | 2.0<br>1.5 | 0.58 | 113 | 215 | 0.71 |
| Example 12 | NaO—⟨C6H4⟩—COONa | 2.0 | AOEZ<br>Micronwhite 5,000S | 3.0<br>1.5 | 0.54 | 112 | 216 | 0.76 |
| Comparative Example 1 | ⟨C6H5⟩—ONa | 0.5 | — | | 0.36 | — | — | — |
| Comparative Example 2 | ⟨C6H5⟩—COONa | 1.0 | Neopentyl glycol dibenzoate | 2.0 | 0.32 | — | — | — |
| Comparative Example 3 | NaOOC—⟨C6H4⟩—COONa | 1.0 | Neopentyl glycol dibenzoate | 2.0 | 0.54 | 116 | 211 | 0.42 |

TABLE 1-continued

| | Crystallization accelerator | wt % | Other additives | wt % | [η] dl/g | Tcc °C. | Tc °C. | Dc |
|---|---|---|---|---|---|---|---|---|
| Comparative Example 4 | NaO—C₆H₄—COONa | 0.01 | Neopentyl glycol dibenzoate | 2.0 | 0.61 | 118 | 203 | 0.30 |
| Comparative Example 5 | HO—C₆H₄—COONa | 1.0 | — | | 0.50 | 118 | 214 | 0.60 |
| Comparative Example 6 | 2-hydroxybenzoic acid Na salt (OH, COONa ortho) | 1.0 | — | | 0.40 | — | 217 | —* |
| Comparative Example 7 | 2-ONa-benzoic acid Na salt (ONa, COONa ortho) | 1.0 | — | | 0.44 | 117 | 214 | 0.60 |
| Comparative Example 8 | 3-hydroxybenzoic acid Na salt (OH, COONa meta) | 1.0 | — | | 0.43 | 117 | 216 | 0.60 |
| Comparative Example 9 | 3-ONa-benzoic acid Na salt (ONa, COONa meta) | 1.0 | — | | 0.34 | — | 219 | —* |

*The decrease of the intrinsic viscosity [η] during the kneading was so substantial that molding was impossible, and the DSC measurement was conducted with respect to the kneaded product.

We claim:

1. A polyethylene terephthalate resin composition comprising a polyethylene terephthalate resin and from 0.1 to 3% by weight, based on the polyethylene terephthalate resin, of an aromatic compound of the formula:

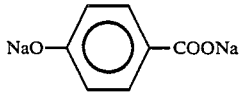

(I)

2. A polyethylene terephthalate resin composition according to claim 1, which further contains from 0.05 to 6% by weight, based on the polyethylene terephthalate resin, of an epoxyalkane compound of the formula

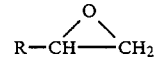

wherein R is an alkyl group having at least 18 carbon atoms.

3. The polyethylene terephthalate resin composition according to claim 1, which has an intrinsic viscosity [η] of from 0.45 to 0.9 dl/g as determined from the viscosity of its solution in a solvent of phenol/tetrachloroethane=50/50 (weight ratio) at 30° C.

* * * * *